United States Patent
Macridis et al.

(10) Patent No.: US 7,133,418 B1
(45) Date of Patent: Nov. 7, 2006

(54) METHOD AND APPARATUS FOR ALLOCATING TIME SLOTS WITHIN A FRAME OF A TDMA FREQUENCY CHANNEL

(75) Inventors: Philip Macridis, London (GB); John Anthony Harper, Valbonne (FR)

(73) Assignee: Inmarsat Global Limited, London (GB)

( * ) Notice: Subject to any disclaimer, the term of this patent is extended or adjusted under 35 U.S.C. 154(b) by 0 days.

(21) Appl. No.: 09/319,460

(22) PCT Filed: Dec. 4, 1997

(86) PCT No.: PCT/GB97/03344
§ 371 (c)(1),
(2), (4) Date: Aug. 9, 1999

(87) PCT Pub. No.: WO98/25358
PCT Pub. Date: Jun. 11, 1998

(30) Foreign Application Priority Data
Dec. 6, 1996 (GB) .............................. 9625475

(51) Int. Cl.
H04J 3/22 (2006.01)
H04B 7/212 (2006.01)
H04Q 7/20 (2006.01)

(52) U.S. Cl. .................. 370/468; 370/458; 370/337; 370/347; 370/442; 370/498; 455/452

(58) Field of Classification Search ............ 370/468, 370/458, 337, 347, 336, 345, 348, 442, 238, 370/238.1, 235, 230, 326, 329, 444, 443, 370/461, 465, 498, 508; 455/450, 452, 453, 455/509, 512
See application file for complete search history.

(56) References Cited

U.S. PATENT DOCUMENTS 4,256,925 A    3/1981    Goode .................. 370/322

(Continued)

FOREIGN PATENT DOCUMENTS

EP    0 637 185    2/1995

(Continued)

OTHER PUBLICATIONS

Kalyan Basu et al. "Multi–rate services: Challenges in Network Design", proceedings of the Global Telecommunications Conference (Globecom). San Francisco, Nov. 28–Dec. 2, 1994, IEEE, vol. 1, pp. 644–649.

(Continued)

*Primary Examiner*—Lee Nguyen
*Assistant Examiner*—Rafael Perez-Gutierrez
(74) *Attorney, Agent, or Firm*—Banner & Witcoff, LTD (57) ABSTRACT

A satellite communications system provides a communications service to a mobile terminal on which different communications applications may be run. Calls are set up between any of the applications via a satellite to a network management center which provides different service adaptors which adapt the calls to different types of service provided over terrestrial networks such as telephony, facsimile, internet or ATM services. The bandwidth allocated to each call over the satellite link may be varied during the call according to demand either from the relevant application or from the network management center. Multiple calls may be connected concurrently to or from different applications running on the mobile terminal. A maximum bandwidth is allocated to each call. Efficient use is thereby made of the limited bandwidth available over the satellite, according to the instantaneous bandwidth requirements of different applications. For real-time calls requiring multiple slots per frame in a TDMA channel, the slots are mutually spaced apart to reduce delay.

9 Claims, 6 Drawing Sheets

U.S. PATENT DOCUMENTS

| | | | |
|---|---|---|---|
| 5,363,374 A | | 11/1994 | Zein Al Abedeen et al. .................... 370/233 |
| 5,446,739 A | | 8/1995 | Nakano et al. ............. 370/357 |
| 5,521,925 A | | 5/1996 | Merakos et al. ............ 455/450 |
| 5,548,801 A | | 8/1996 | Araki et al. |
| 5,570,355 A | * | 10/1996 | Dail et al. ................... 370/352 |
| 5,583,869 A | * | 12/1996 | Grube et al. ................ 370/347 |
| 5,594,738 A | * | 1/1997 | Crisler et al. ............... 370/347 |
| 5,719,859 A | * | 2/1998 | Kobayashi et al. ......... 370/347 |
| 5,729,531 A | * | 3/1998 | Raith et al. .................. 370/337 |
| 5,742,592 A | * | 4/1998 | Scholefield et al. ........ 370/329 |
| 5,748,624 A | * | 5/1998 | Kondo ....................... 370/468 |
| 5,752,193 A | * | 5/1998 | Scholefield et al. ........ 455/452 |
| 6,072,787 A | * | 6/2000 | Hamalainen et al. ....... 370/468 |
| 6,078,577 A | * | 6/2000 | Bishop, Jr. et al. ......... 370/348 |
| 6,148,209 A | * | 11/2000 | Hamalainen et al. ....... 370/329 |
| 2002/0057667 A1 | * | 5/2002 | Hamalainen et al. ....... 370/347 |

FOREIGN PATENT DOCUMENTS

| | | |
|---|---|---|
| EP | 0 713 347 | 5/1996 |
| GB | 2 232 326 | 12/1990 |
| GB | 2 263 847 | 8/1993 |
| GB | 2 270 815 | 3/1994 |
| GB | 2 275 588 | 8/1994 |
| GB | 2 298 999 | 9/1996 |
| GB | 2 302 485 | 1/1997 |
| GB | 2 303 764 | 2/1997 |
| JP | 08008784 | 1/1996 |
| WO | 91/08629 | 6/1991 |
| WO | WO 95/07578 | 9/1995 |
| WO | WO 95/35002 | 12/1995 |
| WO | 96/08934 | 3/1996 |
| WO | WO 96/27975 | 9/1996 |
| WO | WO 97/33393 | 9/1997 |

OTHER PUBLICATIONS

Basu et al., Multi–rate Services: Challenges in Network Design, pp. 644–649, 1994.

Fred J. Kaudel et al., "Performance of an Efficient Discipline for Hybrid STM–ATM Switching and Transport", pp. 1099–1108, 1994.

Brochure: Ride The Way With COMSAT LABS ATM Products.

Two (2) Search Reports.

European Search Report Application No. 01 20 2017.

\* cited by examiner

METHOD AND APPARATUS FOR ALLOCATING TIME SLOTS WITHIN A FRAME OF A TDMA FREQUENCY CHANNEL

FIELD OF THE INVENTION

The present invention relates to a communication method and apparatus and particularly, but not exclusively, to a communication system for allocating bandwidth to a call with a mobile terminal.

BACKGROUND ART

In some satellite and terrestrial mobile communication systems, terminals are available which provide both voice and data communication. For example, some GSM mobile telephones are connectable to data terminals, such as portable computers. During a data call using such mobile terminals, TDMA slots are assigned to the data call in a similar way as to a voice call, so that a constant bandwidth connection is established both in the forward and return direction. Mobile satellite systems, such as the Inmarsat-B™, Inmarsat-C™ and Inmarsat-M™ satellite communication systems, allow fixed-bandwidth data communications.

Such systems are suitable for the exchange of some types of data, but are primarily designed for voice communications, which require a constant symmetrical data rate. Such systems are not optimized for both data and voice communication.

There is an increasing demand for data communications which require intermittent bursts of data to be sent or received at a high data rate, while requiring only low data rate communication at other times. For example, it is desirable when using a Web browser for requested pages to be downloaded as quickly as possible to the user terminal, but little or no bandwidth is required in the forward direction while the user reads the downloaded page. Such usage is also very asymmetrical, since the user only needs to send requests for new pages or small amounts of data in the return direction. The use of such applications over the GSM system is unsatisfactory, since for some of the time during the data call the allocated bandwidth is not used, but while large amounts of data are being downloaded, the allocated bandwidth is insufficient.

Furthermore, it would be desirable to allow multiple calls to be handled concurrently by the same mobile terminal. For example, during a telephone call, a mobile user may wish to refer to data from an online database, or receive an incoming facsimile.

A variable data rate satellite communication system is described in U.S. Pat. No. 4,256,925. In this system, a satellite is used for communication between a plurality of ground stations. Each ground station requests a proportion of the total channel capacity in accordance with the traffic load of voice and data call to that ground station. A reference station in the network allocates the channel capacity among the stations.

An ATM (asynchronous transfer mode) satellite communication system is described in U.S. Pat. No. 5,363,374. Each earth station requests sporadic connection to the communication system and a central management station determines whether to accept or refuse the connection according to the available bandwidth.

The document GB 2 270 815 A discloses a cellular mobile radio system which provides a packet reservation multiple access protocol for implementing a variable bit rate service. The mobile terminals contend for access in the same time slots in which they will transmit information. In order to support variable bit rates, the terminals have the ability to reserve multiple slots in any given frame. Both voice and data calls may be supported in the same frame, with a larger burst size being used for data traffic for greater efficiency, and a small burst size being used for voice traffic to reduce the delay incurred in waiting for enough information from a voice code.

The document EP 0 713 347 A discloses a system for transmission of STM and ATM traffic on a broadband communications network, such as a fiber/coax network or a wireless network in which mobile stations depend on a base station for feedback. ATM calls can be constant bit rate, delay sensitive variable bit rate, delay tolerant variable bit rate or contention based. Delay sensitive variable bit rate calls are allocated time slots in accordance with a statistically weighted incremental bandwidth determination that takes into account existing variable bit rate traffic and the statistical characteristics of the new call request. ATM traffic is assigned a minimum guaranteed bandwidth and any spare bandwidth is assigned among existing ATM calls or used to admit a new ATM call.

STATEMENT OF INVENTION

According to one aspect of the present invention, there is provided a mobile communication system in which the bandwidth available for an individual call between a mobile communications terminal and a base station is varied according to the demand for bandwidth during that call without exceeding a predetermined maximum level determined for that call. Advantageously, the bandwidth may be increased when a large quantity of data is to be sent, but is reduced at other times and the additional capacity made available to other users.

The maximum level may be determined according to the type of call in order to support a peak bandwidth suitable for that type of call.

According to another aspect of the present invention there is provided a method of assigning time slots to individual calls in a TDMA mobile communication system, in which multiple slots within a frame which relate to a real-time call are spaced apart from each other in the frame. Advantageously, this slot allocation scheme reduces the delay incurred by the TDMA frame structure.

According to another aspect of the present invention, there is provided a method of registering a mobile terminal in a satellite communications system which has both spot beams and a global beam, in which the terminal first attempts to communicate in the last spot beam channel used, and only re-registers in the global beam to receive a new spot beam channel allocation if the last spot beam channel cannot be received.

The present invention extends to apparatus for carrying out any of the above methods.

BRIEF DESCRIPTION OF THE DRAWINGS

Embodiments of the present invention will now be described with reference to the accompanying drawings, in which.

MODES OF CARRYING OUT THE INVENTION

System Overview

Figure 1:
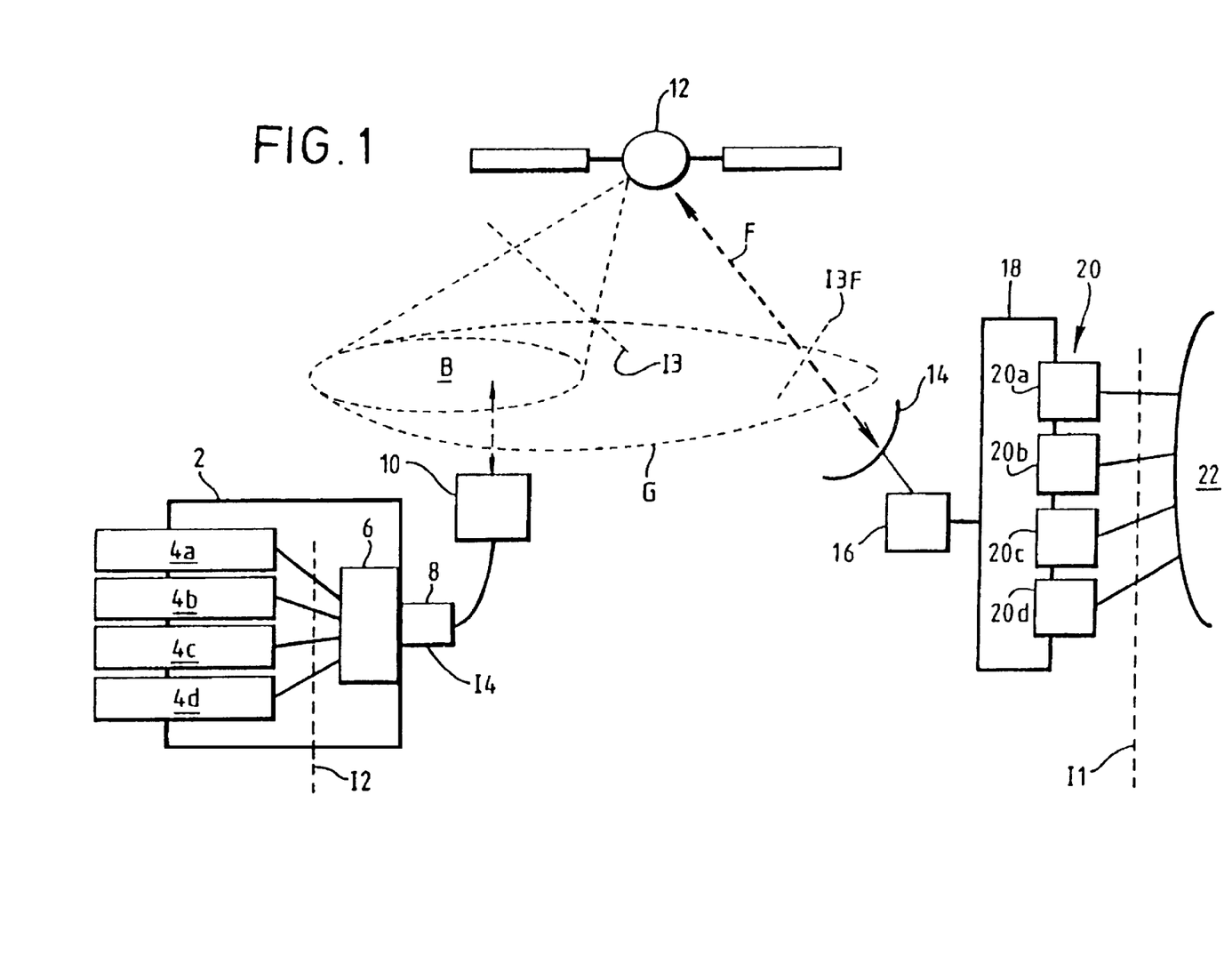
FIG. 1 is a schematic diagram of a satellite communication system according to an embodiment of the present invention.

FIG. 1 shows schematically a mobile terminal connected via a satellite 12 to a network management center 18, which allocates bandwidth to the mobile terminal and connects the mobile terminal to a terrestrial network 22. In this embodiment, the mobile terminal 2 comprises a portable computer on which a number of different communications applications 4a, 4b, 4c, 4d may be run. For example, the applications may be a voice telephony application, an internet application, a facsimile application and an ATM application. Each of these applications use standard application programming interfaces (API) such as Winsock for internet access, TAPI for telephony applications and CAPI for ISDN applications. The interfaces to such applications are shown schematically by the reference I2 in FIG. 1. Driver software 6 running on the mobile terminal 2 converts API protocols to proprietary protocols designed for the satellite communication system. The mobile terminal 2 provides a physical interface I4 to an interface card 8, such as a PC (formerly PCMCIA) card. The interface card 8 includes a radio frequency modulator/demodulator connected to an antenna 10. The radio frequency modulater/demodulator is able to receive on a first frequency channel and to transmit simultaneously on a second frequency channel.

The antenna 10 is located within the coverage region of a spot beam B generated by the satellite 12, which may for example be a geostationary satellite having multibeam receive/transmit antennas for receiving and transmitting signals in each of a plurality of spot beams B. Each spot beam B carries a plurality of frequency channels both in the forward and return directions. The satellite also receives and transmits in a global beam G which has a coverage area extending substantially or completely over the coverage areas of the spot beams B. The global beam G carries at least one forward and one return frequency channel.

The RF signals transmitted between the antenna 10 and satellite 12 comply with an air interface protocol I3, which will be more fully described hereafter. The satellite 12 acts as a repeater and converts channels from multiple spot beams B into channels in a feeder beam F and vice versa. The feeder beam F provides a link between the satellite 12 and an earth station 16 via an earth station antenna 14. The air interface protocol over the feeder beam F is referenced as I3F in FIG. 1.

The network management center 18 is connected to the earth station 16 and includes a number of different service adaptors 20a, 20b, 20c, 20d providing an interface to terrestrial networks 22, such as PSTN, ATM networks or ISDN. For example, the service adaptors 20 may comprise a telephony adaptor 20a including a codec for converting voice signals on a PSTN to data at the network management center 18 and vice versa. A facsimile service adaptor 20b may implement facsimile protocols, such as defined in ITU Recommendations T.30 and T.4 and include a modem for communication over a PSTN. An internet service adaptor 20c implements TCP/IP and an ATM service adaptor 20d implements ATM protocols. These standard protocols and interfaces are designated collectively by I1 in FIG. 1.

The mobile terminal 2 allows multiple different types of communication to be set up over the satellite communication system, such as telephony, internet, fax and ATM. These applications may be run concurrently. The bandwidth allocated to each application may be varied independently in the forward and return directions during a call, as will be described below.

Air Interface Protocols

Figure 2:
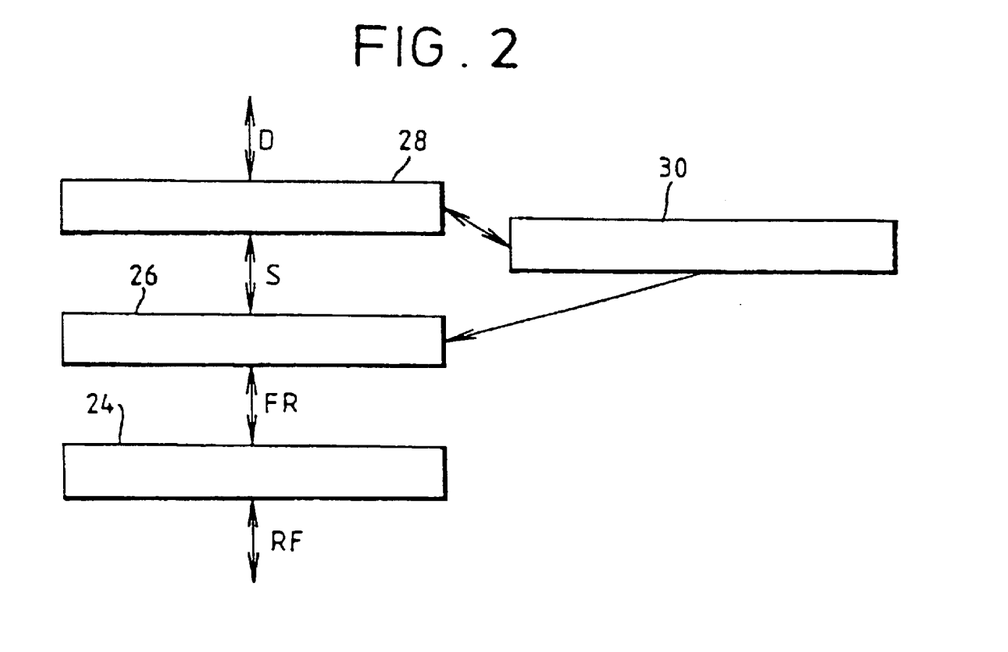
FIG. 2 is a diagram of a protocol layer structure employed by the embodiment of FIG. 1.

The implementation of the air interface protocols I3 and I3F, as performed by the driver software 6 of mobile terminal 2 and by the network management center 18, will now be described with reference to FIGS. 2 and 3. The protocol structure is described in terms of "layers" which interwork with each other as shown in FIG. 2.

The top layer comprises a slot management layer 28 which receives data D from and sends data D to the applications 4 or the service adaptors 20. The data is formatted in slots S, each comprising a cell, as shown in FIG. 3. Each cell C comprises a header H and data D both of fixed length. The slot management layer 28 formats data into and out of slots containing such cells, and exchanges the slots with a TDMA layer 26 which controls the timing of transmission and reception of the slots S within TDMA frames FR, which are sent to or received from a physical layer 24.

The physical layer 24 corresponds to the interface I4, the interface card 8 and the antenna 10, providing a physical interface between the driver software 6 and the air interface I3, or corresponds to the earth station antenna 14 and earth station 16, which likewise provide a physical interface between the network management center 18 and the satellite 12. In both cases, the physical layer 24 converts the frames FR to radio frequency signals RF and vice versa.

The slots S contain, in addition to the traffic data D, signalling information which is used to set up calls and to vary the assignment of bandwidth during a call. The creation and reception of these signals is performed by a session management protocol layer 30, which interworks with the slot management layer 28 and the TDMA layer 26 to receive or transmit signalling information within the cells C, in the header H and/or as data D.

Figure 3:
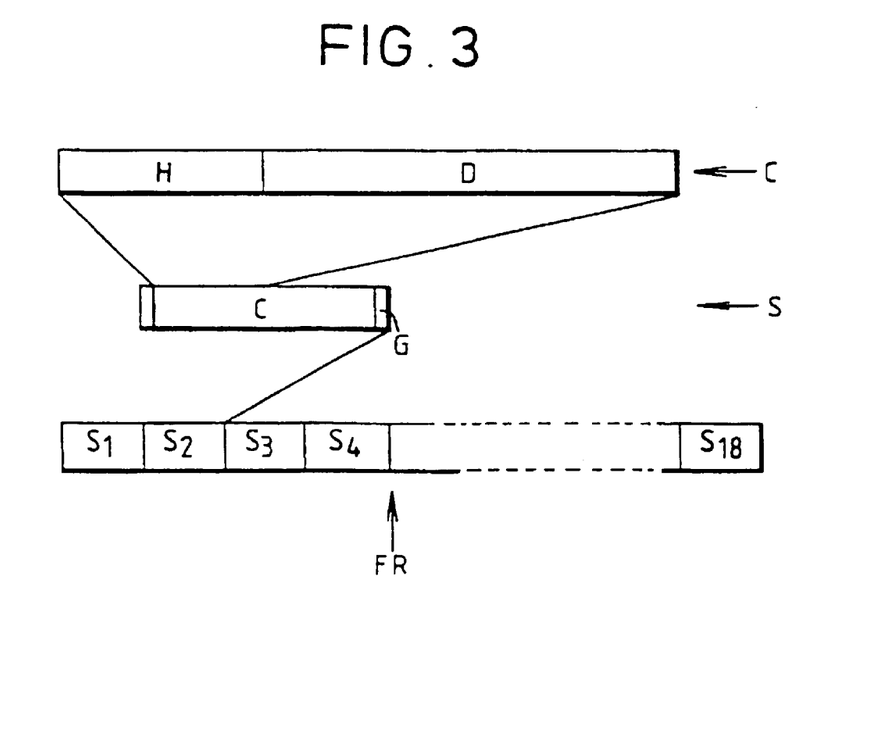
FIG. 3 is a diagram of structure of a TDMA frame according to the air interface protocol of the embodiment of FIG. 1.

As shown in FIG. 3, each TDMA frame is transmitted or received in a format comprising 18 slots $S_1 \ldots S_{18}$, each comprising a cell C, with a guard band G separating each slot. Each slot S also contains synchronization and control information which is used to acquire the timing of the slots, and will not be discussed further.

Each slot S may be assigned to any mobile terminal 2 with which a call has been set up, under the control of the network management center 18.

Alternatively, more than one cell may be transmitted in each slot, with each cell being assignable to a different call to or from the same mobile terminal or even to a different mobile terminal.

Call Management

Figure 4:
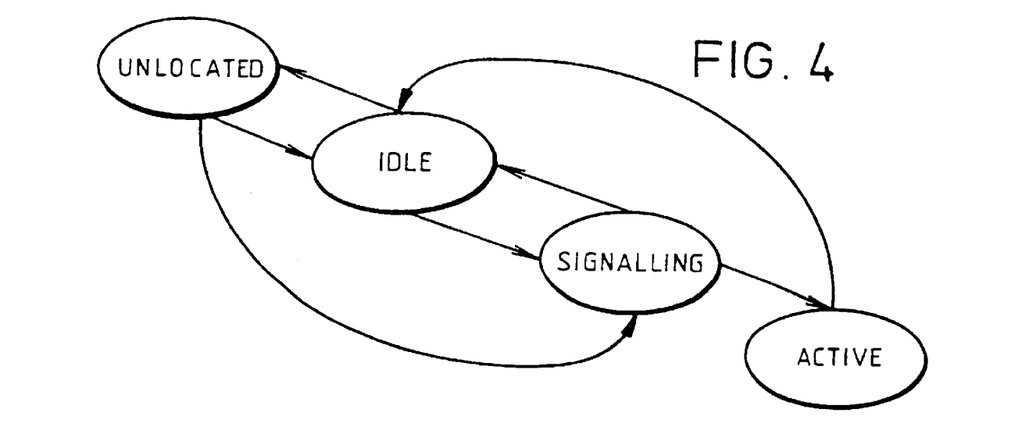
FIG. 4 is a diagram of the states of the mobile terminal in the embodiment of FIG. 1, showing the possible transitions between them.

The different states through which the mobile terminal 2 passes during operation are shown in FIG. 4. In order to communicate with the mobile terminal 2, the network management center 18 determines in which spot beam B the mobile terminal 2 is located. If the mobile terminal 2 is being used for the first time, or has moved into a different spot beam B since it was last used, then the mobile terminal 2 is in an "unlocated" state. When the mobile terminal 2 has acquired a spot beam channel but is not handling any calls, it is in an "idle" state. When a first call is being set up with the mobile terminal 2, it enters a "signalling" state, unless the call set up fails in which case it returns to the "idle" state. When the first call has been set up, the mobile terminal 2 enters an "active" state and remains in the active state until all calls are terminated, when the mobile terminal 2 enters the "idle" state once again. If contact is lost with the spot beam channel, the mobile terminal 2 returns to the unlocated state. Each of these states will now be described in detail.

Unlocated State

Figure 5:
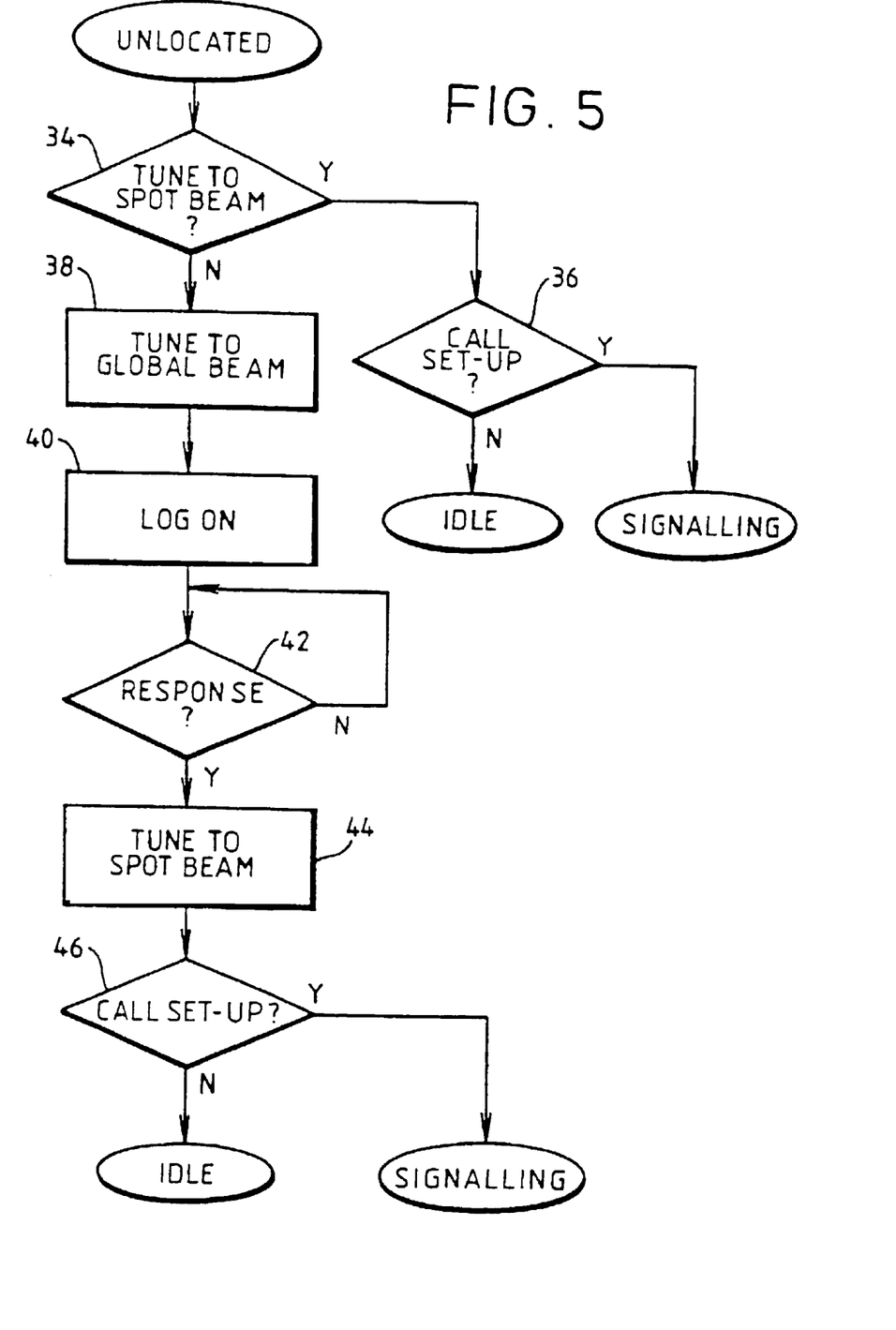
FIG. 5 is a flow diagram of the operation of the mobile terminal beginning from the unlocated state of FIG. 4.

Transitions from the unlocated state will now be described with reference to FIG. 5.

When the mobile terminal 2 is activated, i.e., switched on or otherwise enabled to communicate, the driver software 6 first tunes the interface card 8 to the frequency of the spot beam B last used for communication (step 34), if there has been any previous communication. If the interface card 8 is able to receive in this spot beam B, the driver software 6 detects whether any of the applications 4 have requested that an outgoing call should be set up from the mobile terminal 2 (step 36). If so, the mobile terminal 2 enters the signalling state; otherwise it enters the idle state.

If the interface card 8 is unable to receive signals at the frequency of the previously used spot beam B, then the interface card 8 is tuned to the forward and return frequencies of the global beam G received by the satellite 12 (step 38). The mobile terminal 2 then transmits a "log-on" message (step 40) in the global beam return channel. The log-on message includes identification information identifying both the mobile terminal 2 and its current user, together with location information which is sufficient for the network management center 18 to determine in which spot beam B the mobile terminal 2 is located. This information may be entered by the user of the mobile terminal (i.e., by indicating in what country the mobile terminal 2 is located), or may be derived by positioning equipment in the mobile terminal 2, such as a GPS (Global Positioning System) receiver. Preferably, the positioning information is sufficient to identify in which spot beam B the mobile terminal 2 is located, but does not have sufficient accuracy to allow eavesdroppers to locate the mobile terminal 2 precisely and thereby pose a security risk. If one of the applications 4 has requested that a call be set up, the log-on message may also indicate that the mobile terminal 2 intends to establish a call.

The mobile terminal 2 then awaits a response from the network management center 18 in the forward channel of the global beam G (step 42). The response from the network management center 18 includes identification information so that the response may be correlated with the log-on message, spot beam channel identification information which identifies the frequency channel to be used by the mobile terminal 2 for communication in the spot beam B in which it is located, and timing information derived from the timing of the log-on message as received by the earth station 16, to assist the mobile terminal 2 in synchronizing with the timing of the frames FR. If the mobile terminal 2 indicated in the log-on message that a call is to be set up, the response includes a label which is used in a slot negotiation phase, as will be described later.

The interface card 8 is then tuned to the spot beam channel indicated by the response (step 44). If no calls are currently required either from or to the mobile terminal, the mobile terminal 2 enters the idle state while continuing to monitor the spot beam forward channel, otherwise it enters the signalling state (step 46).

Idle State

Figure 6:
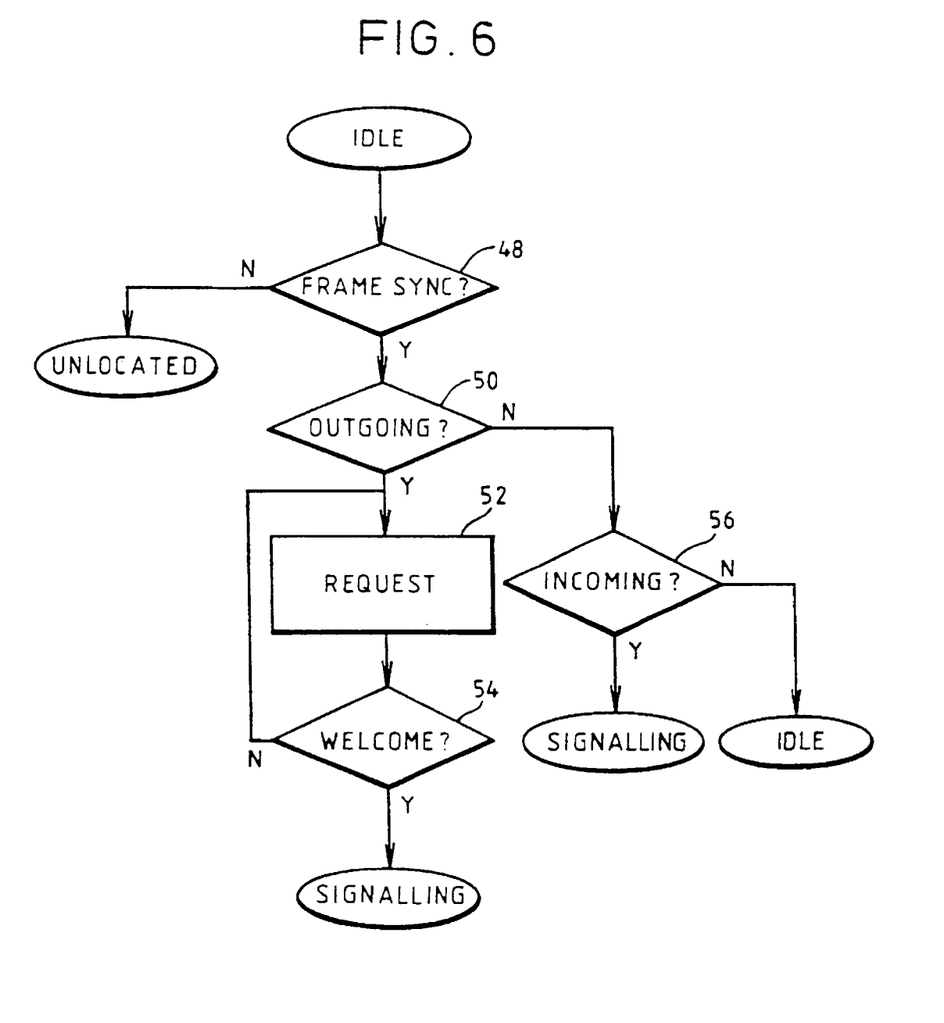
FIG. 6 is a flow diagram of the operation of the mobile terminal beginning from the idle state of FIG. 4.

In the idle state, as shown in FIG. 6, the mobile terminal 2 continuously detects whether it is able to receive frames correctly in the designated spot beam channel (step 48). If it is no longer able to do so, the driver software 6 enters the unlocated state. Otherwise, the mobile terminal 2 detects whether any of the applications 4 require an outgoing call to be set up (step 50). If so, the mobile terminal 2 transmits a request message (step 52) in a slot S reserved for such signalling in the return spot beam channel. The allocation of such slots S is periodically indicated by the network management center 18 in the forward direction spot beam channel. Access to such slots is determined by a slotted aloha access scheme, with the possibility of collision if two mobile terminals 2 attempt to transmit in the same slot, in which case the network management center 18 will not receive either request message. The request message contains identification information identifying the mobile terminal 2.

In response to the request message, the network management center 18 sends a "welcome" message, including a label which is used as a temporary identity code for the mobile terminal 2. If the mobile terminal 2 detects the welcome message (step 54) it enters the signalling state; otherwise, the request is repeated (step 52) after a predetermined period. The period is increased after each unsuccessful request (step 52) and includes a randomized component, to avoid repeated conflict for the same return channel slot with the same other mobile terminals sending request messages. After a predetermined number of unsuccessful requests, the terminal 2 returns to the idle state.

If a call originating from the terrestrial network 22 is to be connected to the mobile terminal 2, the network management center 18 sends identifying information over the forward spot beam channel to the mobile terminal 2, to indicate that an incoming call is to be set up. If the mobile terminal 2 detects such an incoming call (step 56) it enters the signalling state; otherwise if there are no incoming or outgoing calls, the mobile terminal 2 stays in the idle state.

Signalling State

Figure 7:
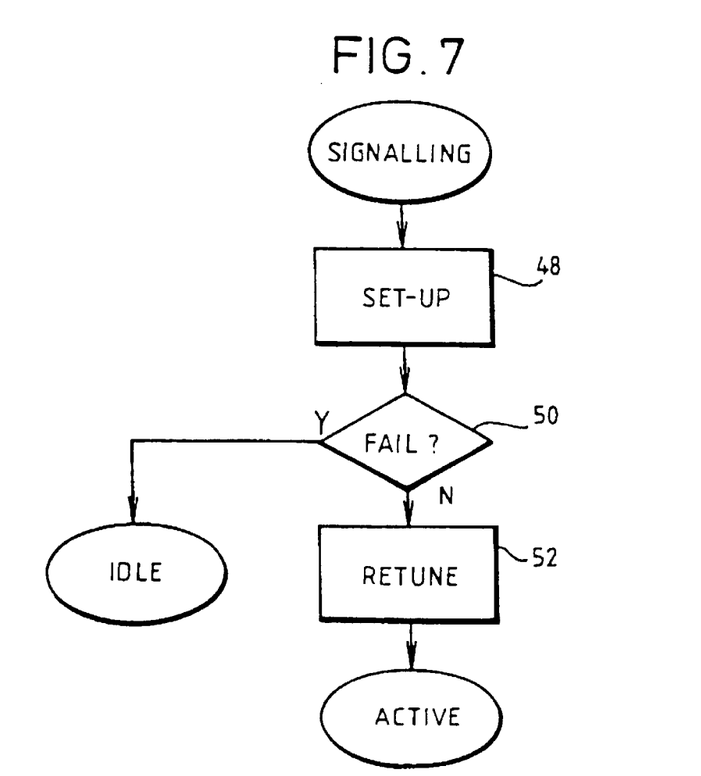
FIG. 7 is a flow diagram of the operation of the mobile terminal beginning from the signalling state of FIG. 4.

In the signalling state, as shown in FIG. 7, a setup protocol exchange takes place (step 48), in which user authentication information is sent by the mobile terminal 2 to the network management center 18 and the addresses of the call and calling parties are exchanged. A committed bit rate (CBR) and maximum bit rate (MBR) are established for each direction of the call. The committed bit rate is a bit rate which is guaranteed throughout the call. The maximum bit rate is the maximum rate that can be assigned to the new call at any stage during the call. These variables are used by the network management center 18 during the call to determine the number of slots allocated to the mobile terminal 2. The MBR and CBR in each direction may be determined according to the type of the call and/or according to a request by the mobile terminal 2 during call set-up. For example, if the call is an internet connection to be used for web access by the mobile terminal 2, a low CBR and MBR are set in the return direction while a low CBR and a high MBR are set in the forward direction, the level of the MBR being set according to a request from the mobile terminal 2.

If setup fails for any reason (step 50), for example because the requested committed bit rate is not available in the spot beam B, or the network management center 18 is unable to connect the call through the terrestrial network, the mobile terminal 2 returns to the idle state.

After the setup exchange, the mobile terminal 2 may retune (step 52) to a different channel within the spot beam B if the channel assigned during setup is not the same as the channel being used for the call. If setup is successful, the mobile terminal 2 enters the active state.

Active State

Figure 8:
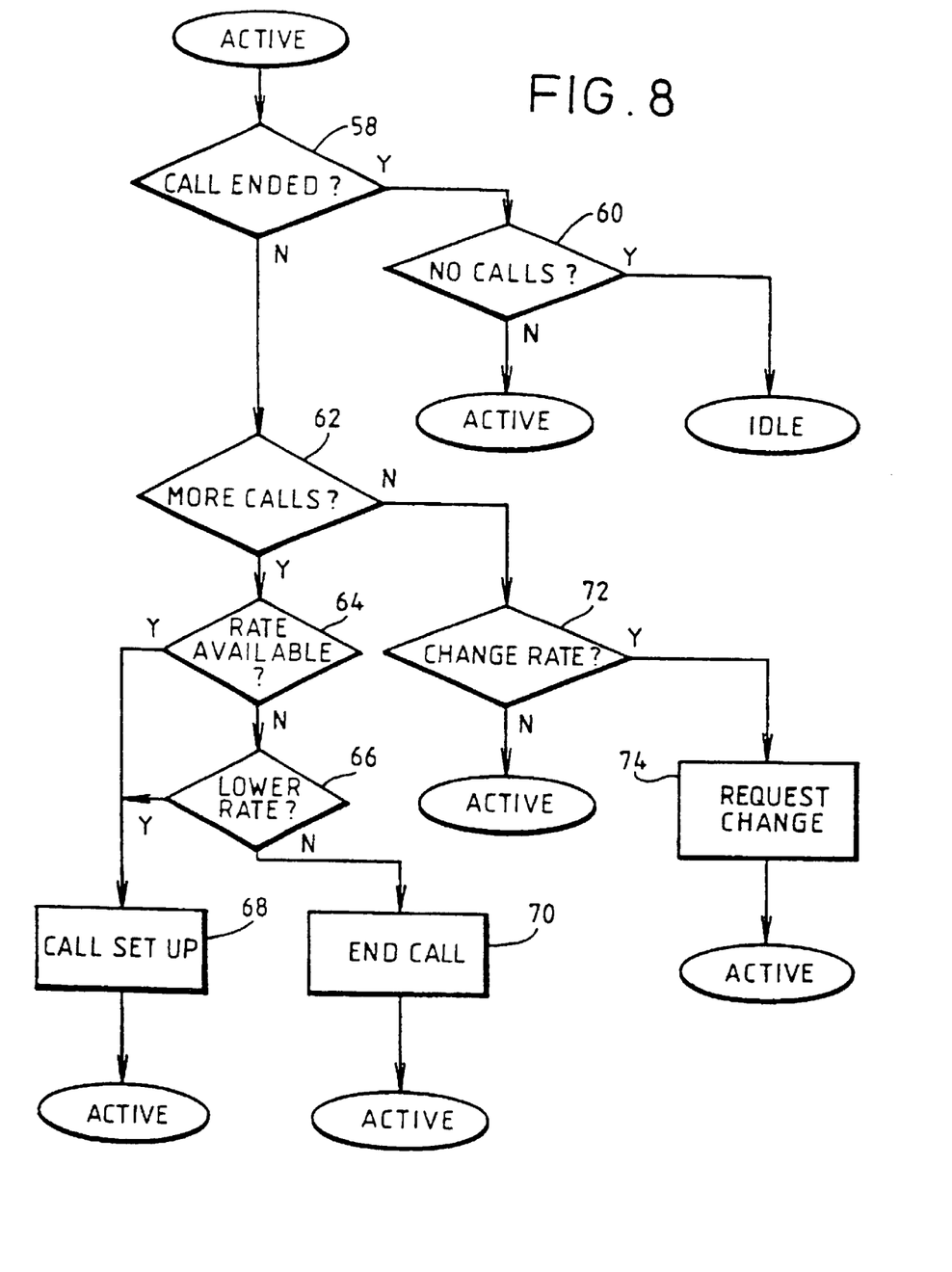
FIG. 8 is a flow diagram of the operation of the mobile terminal beginning from the active state of FIG. 4.

Once the mobile terminal 2 is in the active state, additional signalling may take place between the mobile terminal 2 and the network management center 18 so as to terminate a call, to exchange charging information or system information, to request more or less bandwidth for a call or to establish another call. This information is preferably sent in one or more of the slots already assigned to the mobile terminal 2. Alternatively, in the forward direction the network management center 18 may send signalling information in a cell C of a slot S which is not committed to any mobile terminal 2, and indicate in the header information of this cell that the cell contains signalling information addressed to the mobile terminal 2.

An example of a protocol exchange which may take place in the active state of the mobile terminal 2 is shown in FIG. 8. The mobile terminal 2 detects whether an incoming or outgoing call has been terminated (step 58). If so, it detects (step 60) whether there are now no incoming or outgoing calls. If so, the mobile terminal 2 enters the idle state, while remaining tuned to its current forward and return spot beam channels; otherwise, it continues in the active state.

The mobile terminal 2 also detects whether any additional calls are to be set up (step 62), either signalled by one of the applications 4 in the case of an outgoing call or indicated in a forward direction cell C from the network management center 18 in the case of an incoming call. The mobile terminal 2 determines, by means of a signalling exchange with the network management center 18, whether the committed bit rate required for the new call is available (step 64). If not, the driver software 6 determines whether a lower CBR than the requested CBR is suitable and available for the new call (step 66). If so, the new call is set up (step 68) by assigning additional slots to the new call within the same frequency channels, in addition to the slots which may already be assigned to other calls connected to the mobile terminal 2.

If the lower committed bit rate is not available or acceptable, the call is terminated (step 70) and the mobile terminal 2 continues in the active state, unless there are no other calls in progress in which case the idle state is entered.

If the requested capacity is not available in the frequency channel to which the mobile terminal is currently tuned, but is available in another channel, the network management center 18 may signal to the mobile terminal 2 that the option is available of retuning to another channel and reassigning slots in that channel. If the mobile terminal 2 accepts, it retunes to the new channel and receives a new slot assignment in that channel from the network management center 18.

While the mobile terminal 2 is in its active state, one of the applications 4 may enter a state in which the driver software 6 detects that additional bandwidth is required (step 72). For example, the application may begin to output a large graphics or audio file. In that case, the mobile terminal 2 signals in one of the assigned slots of the return channel that additional slots are required (step 74) in the return direction. If the current bit rate assigned to that call is less than the maximum bit rate, and additional capacity is available in the frequency channel to which the mobile terminal 2 is tuned, the network management center 18 assigns additional slots to the call in the return direction and signals to the mobile terminal which additional slots may be used in the return direction.

Slot Assignment

The system by which slots are assigned to the mobile terminal 2 in both the forward and return direction will now be described in detail. Once the mobile terminal 2 has left the unlocated state, it is tuned to receive one spot beam frequency channel in the forward direction and to transmit in another spot beam frequency channel in the return direction. Each mobile terminal 2 continuously receives in the forward frequency channel, but transmits only in the slots in the return channel which have been assigned to that mobile terminal, and optionally in the slots which have been designated for sending request messages, as described above. The forward and return slots can contain both signalling and call traffic.

As shown in FIG. 3, each cell comprises a header H and data D. The header comprises four bytes, formatted as shown below in Table 1.

TABLE 1

| 8 | 7 | 6 | 5 | 4 | 3 | 2 | 1 | Bit Octet |
|---|---|---|---|---|---|---|---|---|
| Label | | | | | PTI (bits 0,1) | | | 1 |
| PTI (bit 2) | CLP | Return Assignment or Bandwidth Demand | | | | | | 2 |
| VCI | | | | | | | | 3 |
| HEC | | | | | | | | 4 |

A description of each of the fields shown in Table 1 is given below.

Label

The label field contains the label of the mobile terminal which is intended to receive the cell or which transmitted the cell. As described above, the label is a temporary identity code which is assigned to each mobile terminal 2 when it is in the active or signalling state. When the mobile terminal 2 returns to the idle state, its label may be reassigned by the network management center 18 to another mobile terminal 2. In this way, the number of bits needed to address a mobile terminal is reduced. Since each frame FR of a frequency channel contains 18 slots, only 18 different labels are need to identify each of the different mobile terminals tuned to that frequency channel. Six bits are assigned to the label field, allowing additional labels to be used for other purposes. For example, a further label may indicate that the cell contains a broadcast message addressed to all the mobile terminals receiving the frequency channel, or for signalling purposes.

After a mobile terminal returns to the idle state, its label is not made available for reassignment for a predetermined period, to avoid the possibility of the same label being used for two different mobile terminals on the same frequency channel due to loss of call state synchronization between the network management center 18 and the mobile terminal entering the idle state.

Return Assignment

In the forward direction, this field contains the label of the mobile terminal which is allowed to transmit in the corresponding slot of the return channel, for example the slot having the same order in the frame of the return channel.

Bandwidth Demand

This field is used in the return direction to indicate the bandwidth required by the transmitting mobile terminal 2 for all its calls in the return direction. One bit of the bandwidth demand field indicates that additional slots are required in the return direction for signalling purposes, thus allowing signalling to take place without reducing the bandwidth available to currently active calls.

Virtual Channel Identifier (VCI)

This field identifies the individual call with which the cell C is associated, thus allowing a single mobile terminal to support multiple concurrent calls. The driver software 6 identifies the VCI of each cell C addressed to the mobile terminal and directs the contents of the cell to the corresponding application 4. Likewise, data from an active application is assigned a VCI when formatted into a cell by the driver software 6.

Payload Type Identifier (PTI)

This field is present for ATM compatibility, and is passed transparently by the satellite communication system, to allow interworking with terrestrial ATM services through the terrestrial network 22.

Cell Loss Priority (CLP)

This field is also present for ATM compatibility, and is passed transparently by the satellite system.

Header Error Control (HEC)

This field contains a check value calculated from the values from the other three bytes of the header, to allow corrupted headers to be detected.

Bandwidth Allocation

The network management center 18 receives the bandwidth demand fields from each of the mobile terminals 2 transmitting in a single return frequency channel, and allocates return channel slots according to these bandwidth demands, and the committed and maximum rate of each call. The allocation of slots in the return channel is indicated by the return assignment field.

The network management center 18 also determines which slots are addressed to each of the mobile terminals in the forward direction, according to the required capacity in a forward direction for each of the calls. Thus, the capacity allocated in the forward direction may be selected independently from the capacity allocated in the return direction, allowing asymmetric calls to be assigned only so much capacity as is needed in each direction.

The network management center 18 buffers data received from the network 22 for transmission to the mobile terminal 2, and determines the number of slots assigned to each call in the forward direction, and therefore the current forward bit rate, so that the committed bit rate is provided but the maximum bit rate is not exceeded. The current forward bit rate may be determined according to the quantity of data buffered for that call at the network management center; so that a burst of data from the network 22 will result in an increased forward bit rate. Optionally, if capacity on a forward channel is still available even after the maximum bit rate has been assigned to all calls, the maximum bit rate may be exceeded by assigning further slots to calls for which large amounts of data are buffered.

By appropriate selection of the committed and maximum bit rate for each call, various different types of call may be implemented. For example, a voice call may have a maximum bit rate equal to its committed bit rate, which is the bit rate required for the voice signal. Non real-time low bit-rate applications, such as E-mail, may be assigned a low committed bit rate, but a high maximum bit rate so as to clear buffered e-mail at the network management center 18 when there is any unused channel capacity.

Billing Strategy

The network management center 18 may compile billing information according to the committed and maximum bit rates assigned to each call. For example, the billing rate may be proportional to the committed bit rate, with a comparatively small surcharge proportional to the maximum bit rate. In this way, the total capacity of a frequency channel is shared between different mobile users according to their bandwidth requirements, with lower priority non real-time users being charged less for access to the channel.

Real-time Calls

When determining the slot allocation for individual calls, the network management center 18 takes into account whether the call is a real-time call (such as a voice call). For such calls, the delay in transmission to and from the mobile terminal 2 should be kept to a minimum. Therefore, where a real-time call occupies multiple slots in a frame, those slots are spaced apart and distributed as evenly as possible throughout the frame so as to reduce the maximum delay encountered by any of the data in the real-time call. For example, Table 2 below shows the slot allocation where four different voice calls, V1 to V4, are established to four different mobile terminals 2, with each call V occupying four slots S within the frame FR, while Table 3 shows, by way of comparison, an arrangement in which the slots assigned to each call V are grouped together.

TABLE 2

| $V_1$ | $V_2$ | $V_3$ | $V_4$ | $V_1$ | $V_2$ | $V_3$ | $V_4$ | $V_1$ | $V_2$ | $V_3$ | $V_4$ | $V_1$ | $V_2$ | $V_3$ | $V_4$ | | |

TABLE 3

| $V_1$ | $V_1$ | $V_1$ | $V_1$ | $V_2$ | $V_2$ | $V_2$ | $V_2$ | $V_3$ | $V_3$ | $V_3$ | $V_3$ | $V_4$ | $V_4$ | $V_4$ | $V_4$ | | |

In the case shown in Table 3, the data for each call may be buffered for up to one complete frame period. In contrast, the method in accordance with this embodiment, as shown in Table 2, requires data to be buffered for only a small fraction of the frame period, thereby reducing both delay and the size of the buffer required. Real-time calls are therefore given priority when allocating slots, so as to achieve regular spacing of the relevant slots through the frame. Non real-time variable bandwidth calls are then allocated to the remaining slots available so as to assign the committed bit rate to each of these calls. Surplus capacity is then allocated according to demand by the mobile terminals, subject to the maximum bit rate for each call.

While the above embodiment is described with reference to a satellite communications system, aspects of the present invention may also be applied to terrestrial cellular communications systems. The mobile terminal may be portable, may be mounted on a vehicle or form part of a temporary or permanent installation, such as a temporary office building or a wireless telephone booth.

Elements of the embodiment are described in terms of functional blocks. These blocks do not necessarily correspond to discrete units, but functions of more than one functional block may be performed by one discrete unit, or the function of one functional block may be performed by more than one discrete unit.

Although the preferred channel format is TDMA, aspects of the present invention may also be applied to CDMA Communications Systems.

What is claimed is:

1. Apparatus for assigning time slots within a TDMA frame of a frequency channel to a plurality of calls between a base station and one or more mobile terminals, said calls being either real-time time calls or non real-time time calls which have less sensitivity to delay then real-time time calls and comprising at least one real-time call requiring a plurality of time slots per frame; the apparatus comprising:

means for determining which of said plurality of calls are real-time calls requiring allocation of a plurality of time slots in said TDMA frame; and means for allocating said time slots in said frame to said real-time calls such that the plurality of time slots allocated to each of said real-time time calls are mutually spaced apart in said TDMA frame in said frequency channel.

2. Apparatus as claimed in claim 1, wherein said means for allocating are further arranged to allocate one or more time-slots to each of said non real-time time calls from the time slots in said frame not allocated to each of said real-time calls, a number of said time slots allocated to said non real-time call being variable during said non real-time call according to a current bandwidth allocation for said non real-time call.

3. Apparatus as claimed in claim 1 or 2, further comprising means for transmitting call signals in said time slots in accordance with the allocation of said time slots.

4. The apparatus as claimed in claimed 1, wherein at least one of the real-time calls comprises a voice call.

5. A method of assigning time slots within a TDMA frame of a frequency channel to a plurality of calls between a base station and one or more mobile terminals, said calls being either real-time calls or non real-time calls and comprising at least one real-time call requiring a plurality of time slots per frame; the method comprising:

determining which of said plurality of calls are real-time calls requiring allocation of a plurality of time slots in said TDMA frame; and allocating said time slots in said frame to said real-time calls such that the plurality of time slots allocated to each of said real-time call are mutually spaced apart in said TMDA frame in said frequency channel.

6. A method as claimed in claim 5, wherein said TDMA frequency channel is a return channel for communication from said one or more mobile terminals to said base station, the method further comprising:

transmitting to said one or more mobile terminals information relating to the allocation of said time slots in the return channel, such that call signals are transmitted by said one or more mobile terminals in said allocated slots of the return channel.

7. A method as claimed in claim 5, wherein said TDMA frequency channel is a forward channel for communication from said base station to said one or more mobile terminals, the method further comprising transmitting call signals in said time slots in accordance with the allocation of said time slots.

8. A method as claimed in any preceding claim, further comprising allocating one or more time slots to each of said non real-time calls from the time slots in said frame not allocated to each of said real-time calls, a number of said time slots allocated to said non real-time call being variable during said non real-time call according to a current bandwidth allocation determined for said non real-time call.

9. The method as claimed in claim 5, wherein at least one of the real-time calls comprises a voice call.

* * * * *